United States Patent
Ledwell et al.

(10) Patent No.: US 11,590,876 B2
(45) Date of Patent: Feb. 28, 2023

(54) TRUCK LOAD BED WITH HYDRAULIC TILT/HYDRAULIC TAIL THAT UTILIZES A UNIFIED HINGE

(71) Applicant: Ledwell and Son Enterprises, Inc., Texarkana, TX (US)

(72) Inventors: Steve Ledwell, Texarkana, TX (US); Gary G. Gathright, Texarkana, TX (US)

(73) Assignee: LEDWELL AND SON ENTERPRISES, INC., Texarkana, TX (US)

(*) Notice: Subject to any disclaimer, the term of this patent is extended or adjusted under 35 U.S.C. 154(b) by 239 days.

(21) Appl. No.: 17/133,084

(22) Filed: Dec. 23, 2020

(65) Prior Publication Data

US 2021/0206306 A1 Jul. 8, 2021

Related U.S. Application Data

(60) Provisional application No. 62/956,860, filed on Jan. 3, 2020.

(51) Int. Cl.
*B60P 1/16* (2006.01)
*B60P 1/273* (2006.01)
*B60P 1/28* (2006.01)

(52) U.S. Cl.
CPC .............. *B60P 1/165* (2013.01); *B60P 1/273* (2013.01); *B60P 1/283* (2013.01)

(58) Field of Classification Search
CPC ............ B60P 1/165; B60P 1/273; B60P 1/283

USPC .......... 298/17 R, 12, 17.5, 17.8, 22 B, 22 D, 298/22 R; 414/482, 462, 480, 537
See application file for complete search history.

(56) References Cited

U.S. PATENT DOCUMENTS

| | | | | |
|---|---|---|---|---|
| 5,924,836 A | * | 7/1999 | Kelly | B62D 63/061 414/537 |
| 6,547,335 B2 | * | 4/2003 | McSweeney | B60P 3/122 298/17.5 |
| 2007/0018429 A1 | * | 1/2007 | Randall | B60D 1/54 280/491.1 |
| 2007/0296246 A1 | * | 12/2007 | Roseborough | B62D 63/061 296/159 |
| 2010/0084839 A1 | * | 4/2010 | Mayfield | B62D 63/061 280/656 |
| 2011/0221168 A1 | * | 9/2011 | Alexander | B62D 63/061 280/639 |
| 2017/0066360 A1 | * | 3/2017 | Bushek | B60P 1/43 |

* cited by examiner

*Primary Examiner* — D Glenn Dayoan
*Assistant Examiner* — Sunsurraye Westbrook
(74) *Attorney, Agent, or Firm* — Leason Ellis LLP

(57) ABSTRACT

A unified hinge may comprise a hinge tube that is rigidly attached to a truck frame and a bed section of a truck bed and a tail section of the truck bed, each of the bed section and the tail section having opposing hinge barrels affixed thereto that concentrically align on the hinge tube. Similarly, a unified hinge may comprise one or more mounting barrels that are rigidly attached to a truck frame and a bed section of a truck bed and a tail section of the truck bed, each of the bed section and the tail section having opposing hinge barrels affixed thereto that concentrically align on the one or more mounting barrels; a hinge tube runs through the one or more mounting barrels and the opposing hinge barrels. The unified hinge allows the bed section and the tail section to independently pivot along the hinge tube.

17 Claims, 15 Drawing Sheets

TRUCK LOAD BED WITH HYDRAULIC TILT/HYDRAULIC TAIL THAT UTILIZES A UNIFIED HINGE

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The inventions described herein generally relate to multi-part truck beds, for example, multi-part truck beds that utilize a unified hinge as the linkage therebetween.

DESCRIPTION OF THE RELATED ART

Prior art truck bed systems lack the flexibility of a hydraulic tilting bed accompanied by a hydraulic tail that may include a fold tail, which provides a number of disparate loading and unloading methodologies to successfully accommodate a number of disparate load types.

To the extent that multi-part or section truck beds are to be found by one of ordinary skill in the prior art, such prior art truck beds utilize multi-part hinges that fail to provide a seamless, single plane between various parts of a truck bed when in raised and lowered positions. For example, FIG. 8 presents a cross view of a prior art multi-part hinge that fails to provide a seamless, same angle plane between various parts of a truck bed when in a partially raised position. More specifically, FIG. 8 presents a prior art double hinge in which a central member 802 is rigidly affixed to a truck body (not pictured). On each side of the central member 802 are two independent hinge pins: left hinge pin 810 and right hinge pin 804. On the left side of the central member 802, a plurality of left hinge barrels 812 are affixed to a bed section 814, whereas on the right side of the central member 802 are similarly situated a plurality of right hinge barrels 806 affixed to a tail section 808. The left hinge barrels 812 and the right hinge barrels 806 interface with their respective hinge pins, i.e., a given one of the plurality of left hinge barrels 812 interface with the left hinge pin 810 to connect the bed section to the central member and a given one of the plurality of right hinge barrels 806 interface with the right hinge pin 804 to connect the tail to the central member.

In accordance with the prior art, hinge barrels 812 used to affix the bed section 814 to the central member 802 interface with a first hinge pin 810, whereas hinge barrels 806 used to affix the tail section 808 to the central member 802 independently interface with a second hinge pin 804. A hinge such as the one illustrated by FIG. 8, however, suffers from the severe drawback of being unable to deploy the bed section and tail section at the same angle as a single plane, thereby failing to provide a single plane from the distal end of the bed section to the proximate end of the tail section. This failure, which results in a ledge or step at the point of the central member when the bed section is raised and the tail section is lowered, results in issues with loading and unloading certain types of cargo under various conditions.

There is therefore a need in the art for a new unified hinge member that overcomes the shortcomings found in prior art systems for interfacing disparate sections of a multi-section truck bed that provides the capability of deploying the bed and tail sections of a truck bed at the same angle as a single plane, thereby providing a raised truck bed surface as a single plane from the distal end of the bed section to the proximate end of the tail section.

SUMMARY OF THE INVENTION

Embodiments of the invention disclosed herein are directed towards a unified hinge that according to one embodiment comprises a hinge tube that is rigidly attached to a truck frame. The embodiment further comprises a bed section of a truck bed and a tail section of the truck bed, each of the bed section and the tail section having opposing hinge barrels affixed thereto that concentrically align on the hinge tube. Use of the unified hinge in accordance with this embodiment allows the bed section and the tail section independently pivot along the hinge tube.

A unified hinge according to an alternative embodiment comprises one or more mounting barrels that are rigidly attached to a truck frame. The embodiment further comprises a bed section of a truck bed and a tail section of the truck bed, each of the bed section and the tail section having opposing hinge barrels affixed thereto that concentrically align on the one or more mounting barrels. A hinge tube runs through the one or more mounting barrels and the opposing hinge barrels so as to allow the bed section and the tail section independently pivot along the hinge tube.

Further embodiments of the present invention are directed towards a truck bed that utilizes a unified hinge. The truck bed in accordance with the present embodiment comprises a hinge tube that is rigidly attached to a truck frame of a truck, as well as a bed section of a truck bed and a tail section of the truck bed, each of the bed section and the tail section having opposing hinge barrels affixed thereto that concentrically align on the hinge tube. A first hydraulic cylinder, which may comprise a first pair of hydraulic cylinders, is attached to the truck frame and the bed section such that extension of a piston in the first hydraulic cylinder causes the bed section to raise. Similarly, a second hydraulic cylinder, which may comprise a second pair of hydraulic cylinders, is attached to the truck frame and the tail section, extension of a piston in the second hydraulic cylinder causing the tail section to lower.

The truck bed in accordance with the present embodiment comprises a fold tail section and an interface that connects the fold tail section to the tail section. The interface, which may comprise a standard hinge, allows the fold tail section to move between a stowed state, which is affixed to an underside of the tail section, and a deployed state, e.g., at a co-incident angle with the tail section. A third hydraulic cylinder may be attached to the tail section and the fold tail section, wherein extension of a piston in the third hydraulic cylinder causes the fold tail section to move between the stowed state and the deployed state. A lock is provided to maintain the fold tail section in the stowed state, which relieves pressure on the third hydraulic cylinder.

Hydraulic cylinders utilized by various embodiments of the present invention may comprise single acting telescoping hydraulic cylinders, dual acting telescoping hydraulic cylinders, dual acting single stage hydraulic cylinders, and other suitable hydraulic cylinders known to those of skill in the art. A control interface is provided to extend and retract the hydraulic cylinders attached to the bed section, the tail section, and the fold tail section, e.g., extend and retract the piston in the first hydraulic cylinder and the piston in the second hydraulic cylinder. According to one embodiment, the control interface comprises a set of one or more physical controls affixed to the truck frame. Alternatively, or in conjunction with the foregoing, the control interface comprises a remote control carried by an operator of the truck. Other control interfaces known to those of skill in the art are considered as falling within the scope of the present embodiments.

The presently disclosed design presents concepts and ideas that improve upon existing designs for interfacing disparate sections of a multi-section truck bed in operation, mechanical advantage, fabrication and installation, and manner of cargo that can be safely loaded and offloaded. Accordingly, embodiments of the present invention provide the advantages of the prior art systems while eliminating the drawbacks associated therewith.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF EMBODIMENTS THE INVENTION

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized, and structural changes may be made without departing from the scope of the present invention. Likewise, a reasonably broad scope for claimed or covered subject matter is intended. Among other things, for example, subject matter may be embodied as methods, devices, components, or systems. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Figure 1:
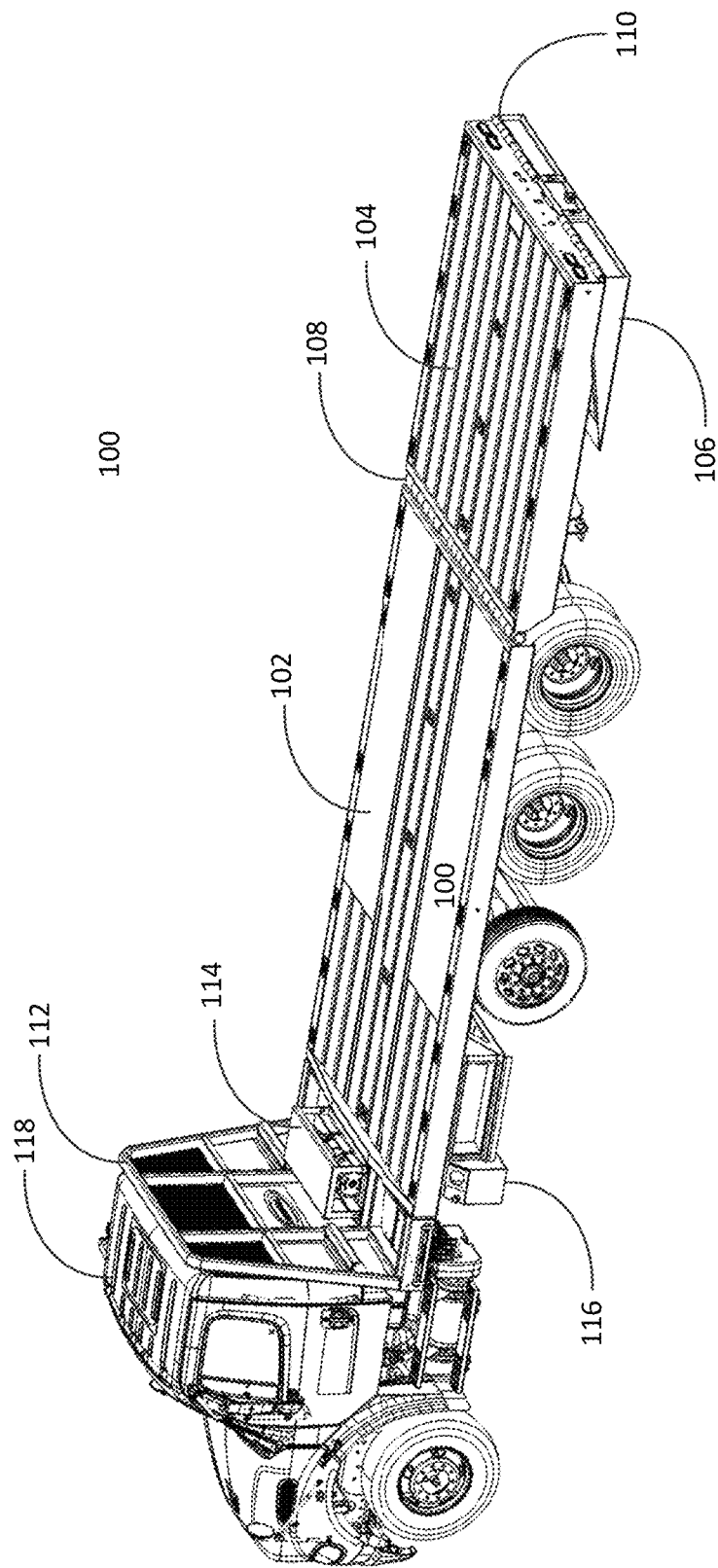
FIG. 1 presents a schematic illustrating a hydraulic tilt/hydraulic tail (HTHT) truck bed according to one embodiment of the present invention.
Figure 2:
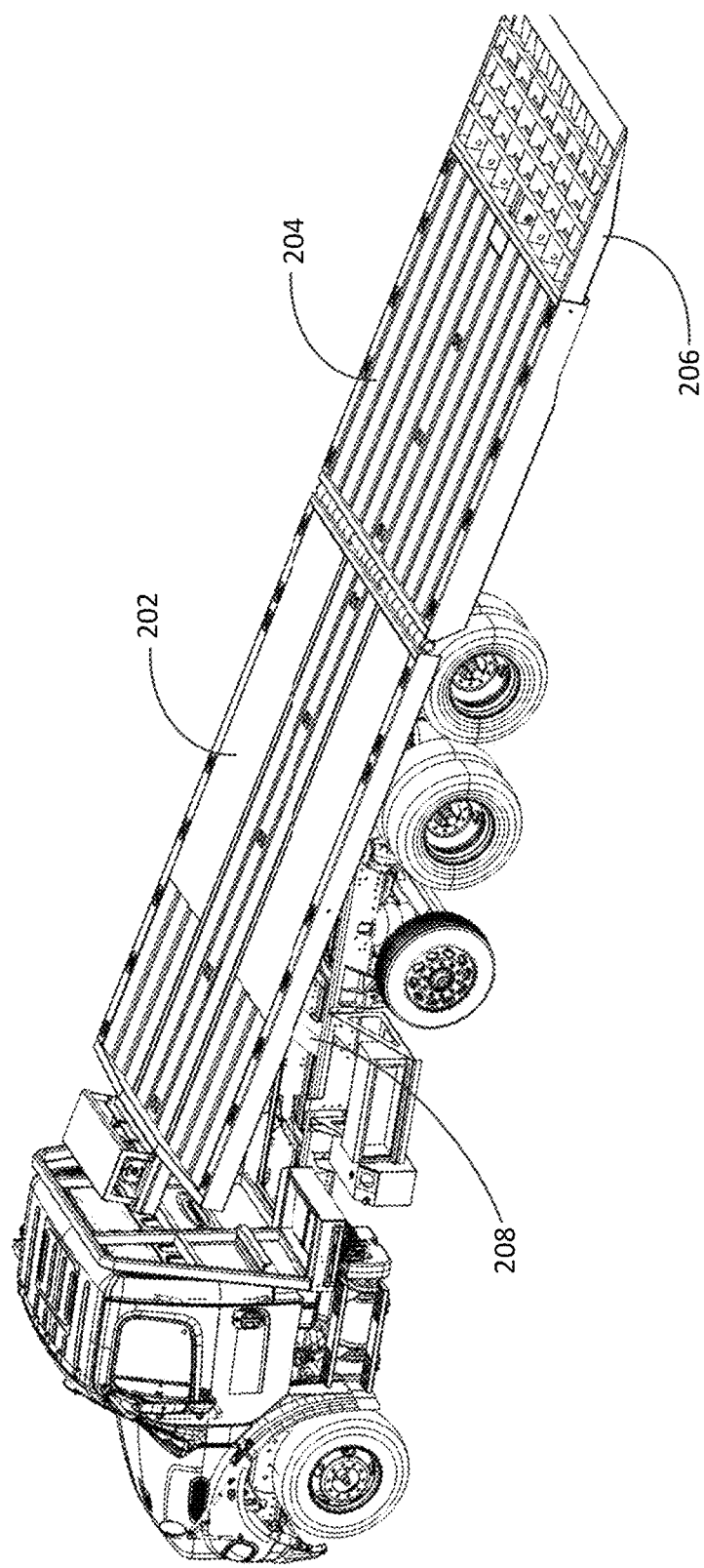
FIG. 2 presents a schematic illustrating a truck bed in which the bed section, tail section and fold tail section are set to single plane according to one embodiment of the present invention.

FIGS. 1 and 2 present a truck with accompanying multi-section truck bed in various states of deployment and in conjunction with the mechanical and power components that provide for such deployment. FIG. 1 illustrates a truck bed 100 in accordance with one embodiment of the present invention. The exemplary truck bed 100 comprises a bed section 102, a tail section 104 and a fold tail section 106. In the present illustration, the bed section 102 is in its lowered position, the tail section 104 is in its neutral position, and the fold tail section 106 is in its "stowed" position, as opposed to its extended or deployed position. In this configuration, which is suitable for when the truck is in general motion, e.g., driving down a throughfare, the sections 102 and 104 provide a flat plane upon which to transport cargo.

Continuing with FIG. 1, an interface 108 exists between the bed section 102 and the tail section 104. Similarly, an interface 110 exists between the tail section 104 and the fold tail section 106. As is explained in greater detail herein, the given interface 108 provides a unified hinge that eliminates the need for a central member to act as an intermediary point onto which to attach the interface. The operator interacts with the hydraulic controls to pump hydraulic oil from a tank 116 to extend and retract hydraulic cylinders disposed beneath the sections 102, 104 and 106, which allow the operator to raise and lower the bed section 102, raise and lower the tail section 104, and deploy and retract the fold tail section 106. A hydraulic winch 114 at end of the bed section 102 that is distal from the tail section 104 is for use in pulling cargo onto the bed section 102, as well as lowering cargo when the bed section 102 is in its raised position. An optional frame or grate 112 is attached to the truck frame against the cab 118 of the truck.

FIG. 2 illustrates the exemplary HTHT truck bed in a partially raised position and in which the fold tail 206 is in its extended or deployed position, the tail section 204 is in its lowered position, and the bed section 202 is partially raised so that all sections are in a single plane, i.e., a truck bed surface that forms a single plane not interrupted by central member to which each section is mounted. A set of hydraulic cylinders 208 interface with the bed section 202 such that the bed section 202 raises as the piston rods in the hydraulic cylinders 208 deploy and lower as the piston rods in the hydraulic cylinders 208 retract. Again, using a unified hinge eliminates the need for a central member to act as an intermediary point onto which to attach the interfaces along which the sections 202, 204 and 206 pivot, thereby allowing multiple sections to remain in a single plane when configured in accordance with various states of deployment.

Figure 3:
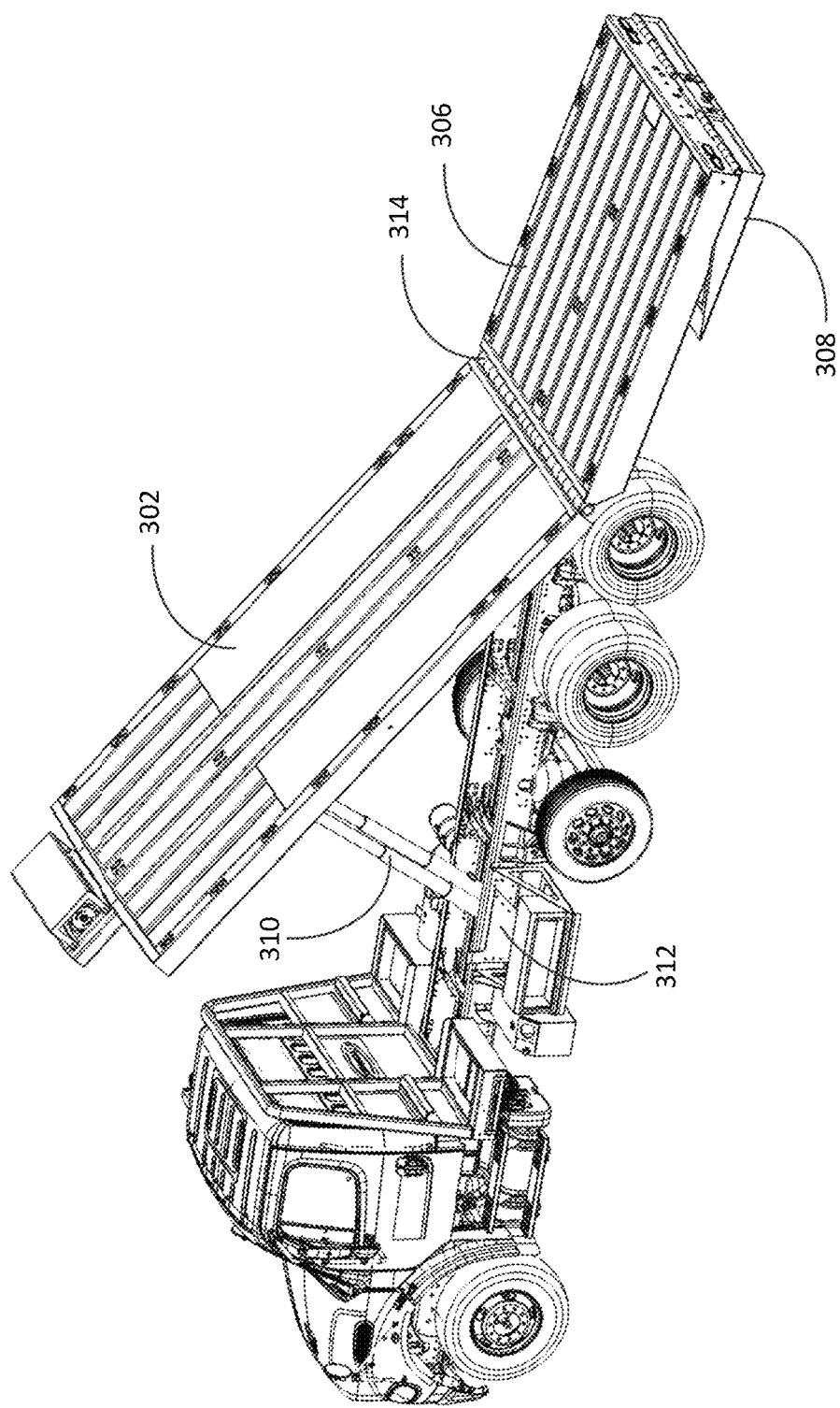
FIG. 3 illustrates a truck bed with the bed section raised to its max height, the tail section down and the fold tail section not deployed according to one embodiment of the present invention.
Figure 4:
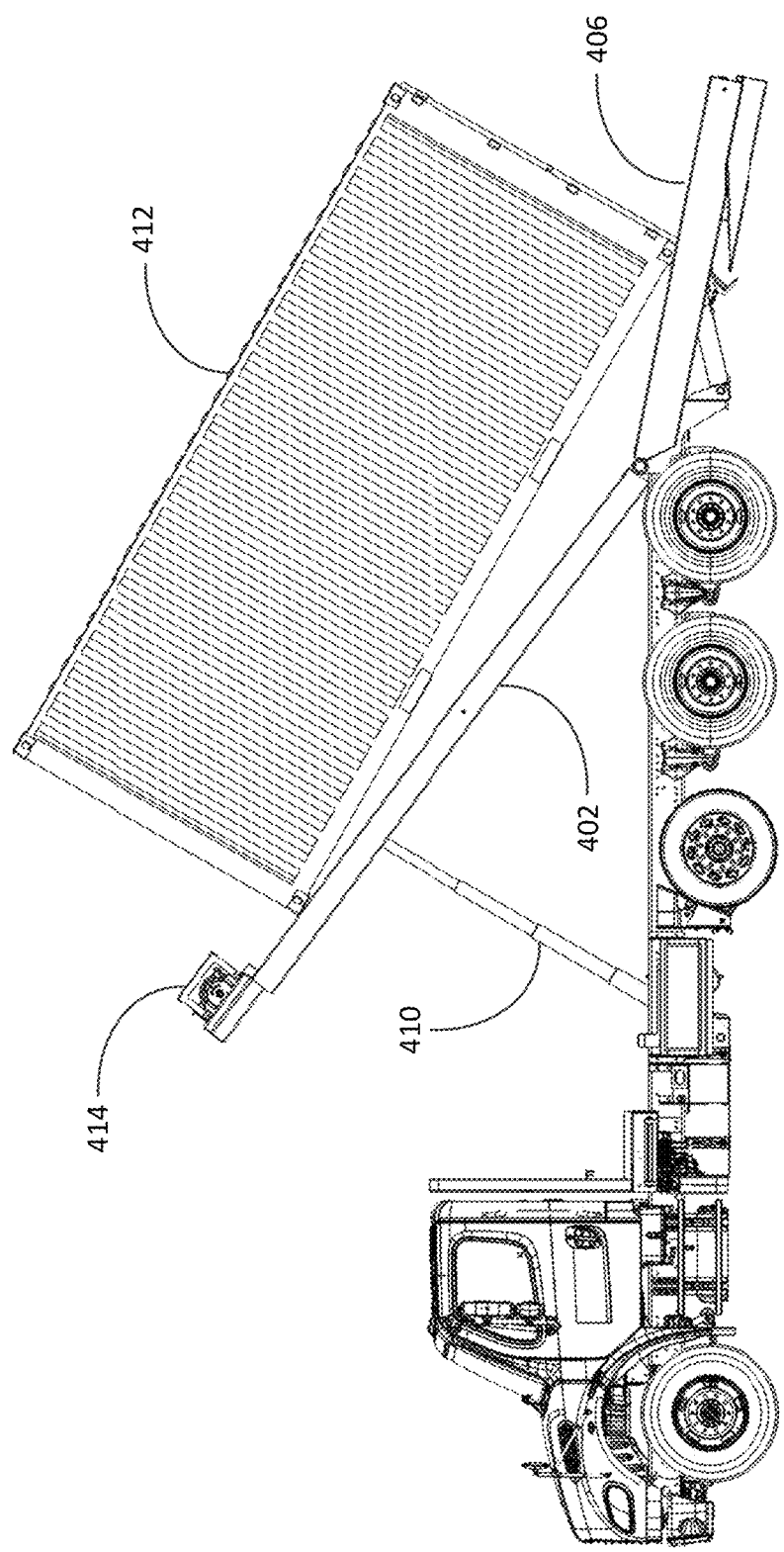
FIG. 4 illustrates the embodiment of FIG. 3 with a load set for slide off according to one embodiment of the present invention.

FIG. 3 presents a perspective view of the truck bed introduced in FIGS. 1 and 2 where the bed section 302 is raised to its maximum position. The tail section 306 is lowered and the fold tail section 308 in its stowed position. A pair of hydraulic cylinders 310 are in communication with the truck chassis 312 and an underside of the bed section 302. When the piston rods in the hydraulic cylinders 310 deploy, the bed section 302 raises, and as the piston rods in the hydraulic cylinders 310 retract the bed section 302 lowers back to a state parallel to the road surface. The use of the unified hinge 314 allows the bed section 302 to pivot against the tail section 306 without the use of a central member to act as an intermediary mount point. FIG. 4 presents a side view of the truck bed of FIG. 3, where the bed section 402 is raised to its maximum position with the hydraulic cylinders 410 fully deployed. In accordance with various embodiments, the bed section 402 can achieve an approximate 37 degree dumping angle to easily unload containers. Control over the rate at which an item of cargo 412 is unloaded is provided by the hydraulic winch 414—a line on the winch 414 is connected to the item of cargo 412 that is slid off the bed section 402 and tail section 406 as the winch 414 deploys the line.

Figure 5:
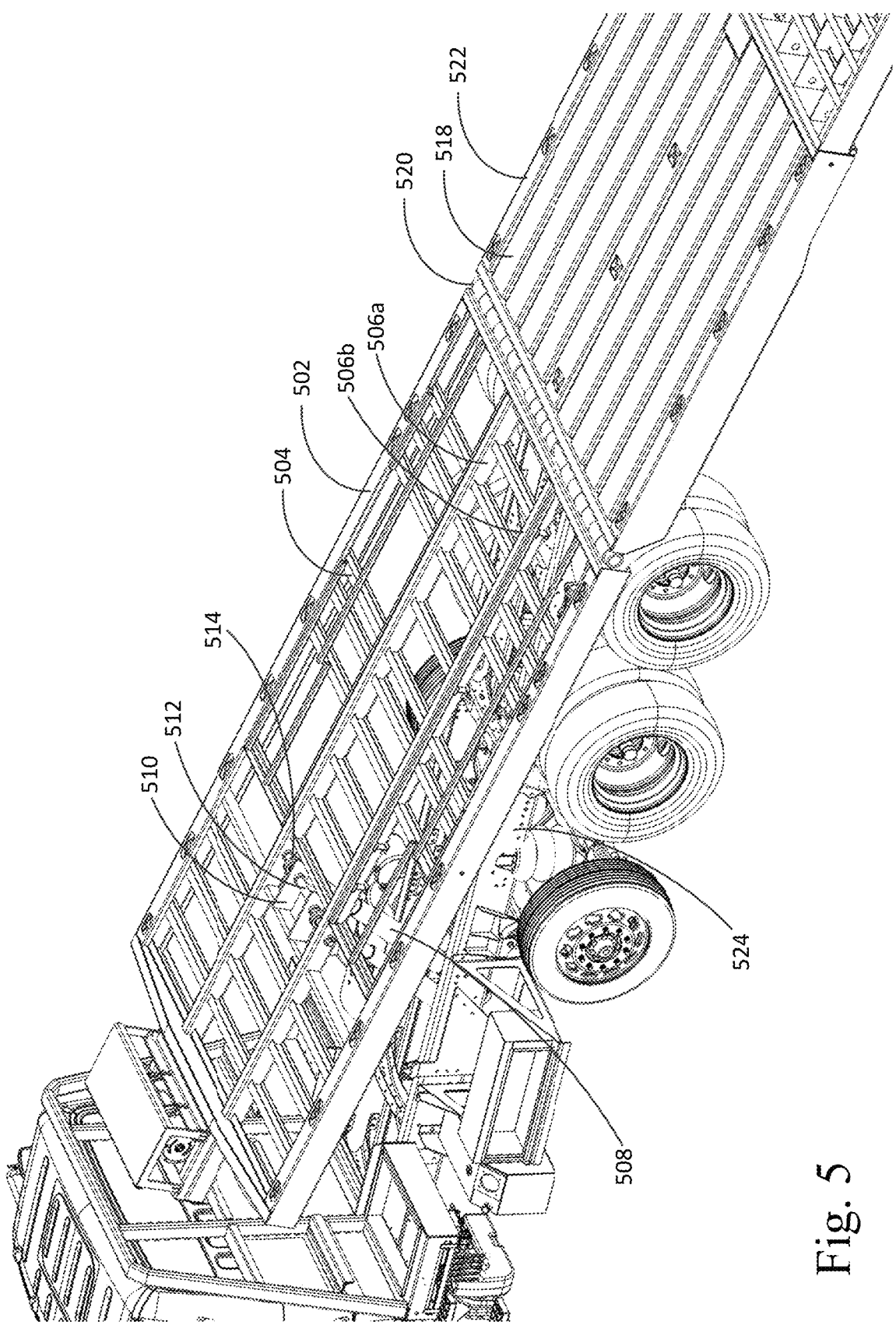
FIG. 5 illustrates the bed of a truck bed with the floor slats removed to expose the hydraulics and linkage according to one embodiment of the present invention.

FIG. 5 presents a top perspective view of one embodiment of a bed section of a truck bed with a portion of the floor slats 518 on the bed section 502 removed to expose a representative embodiment of the hydraulic cylinders 508 and related interlinkages used to raise and lower the bed section 502. The bed section 502 in accordance with the present embodiment comprises a pair of rigid center beams 506*a* and 506*b* that provide stability and rigidity to the bed section 502. Providing further stability and rigidity are a plurality of cross members 504 disposed between the center beams 506*a* and 506*b*, as well as between a given one of the center beams 506*a* and 506*b* and side rails of the bed section 502.

As is explained herein in greater detail, the bed section 502 interfaces with or is connected to the truck frame at the point of the unified hinge 520. The unified hinge 520 provides a pivot point across which the bed section 502 may pivot from a lowered position to a fully raised position, in addition to other points therebetween. A tail section 522 pivots on the far side of the unified hinge and when moved into a lowered position against the bed in its raised position allows for the truck bed to provide a single plane of loading and unloading. As such, interfacing the bed section 502 of the truck with the tail section 522 using a unified hinge 520 in accordance with embodiments of the present invention provides for a truly unified bed capable of providing the best features of a rollback truck and a hydraulic tail truck.

Embodiments of the present invention may utilize a number of different types of power transfer mechanisms to raise and lower the bed section 502, which in the present embodiment comprise a pair of single acting telescopic hydraulic cylinders 508. Using single acting telescopic hydraulic cylinders 508, pressurized hydraulic oil extends the telescopic cylinder to raise one end of the bed section, which can be used to expel a load contained thereon. When pressure is released, the weight of the bed section forces the hydraulic oil out of the telescopic cylinder causing it to retract. This is in comparison to double-acting telescopic cylinders, which are powered hydraulically in both directions and also may be utilized by various embodiments.

As FIG. 5 illustrates, the hydraulic cylinders 508 are connected to both the bed section 502 and the truck chassis 524 so as to raise and lower the bed section 502 along the point of the unified hinge 520. Turning specifically to the interconnection between the hydraulic cylinders 508 and the bed section 502, a pair of linking members 510 are disposed between a pair of cross members 504 to provide a surface against which to mount the hydraulic cylinders 508. Selection of cross members 504 against which to mount the linking members 510 is dependent of the length of the bed section 502; those of skill in the art recognize the optimal point at which to interconnect the bed section 502 and hydraulic cylinders 508 on the basis thereof. Each of the hydraulic cylinders 508 has an eyelet structure 514 at the bed end through which a mounting pin 512 is disposed. The mounting pin 512 further passes through each of the linking members to thereby link the hydraulic cylinders 508 to the bed section 502.

Figure 6:
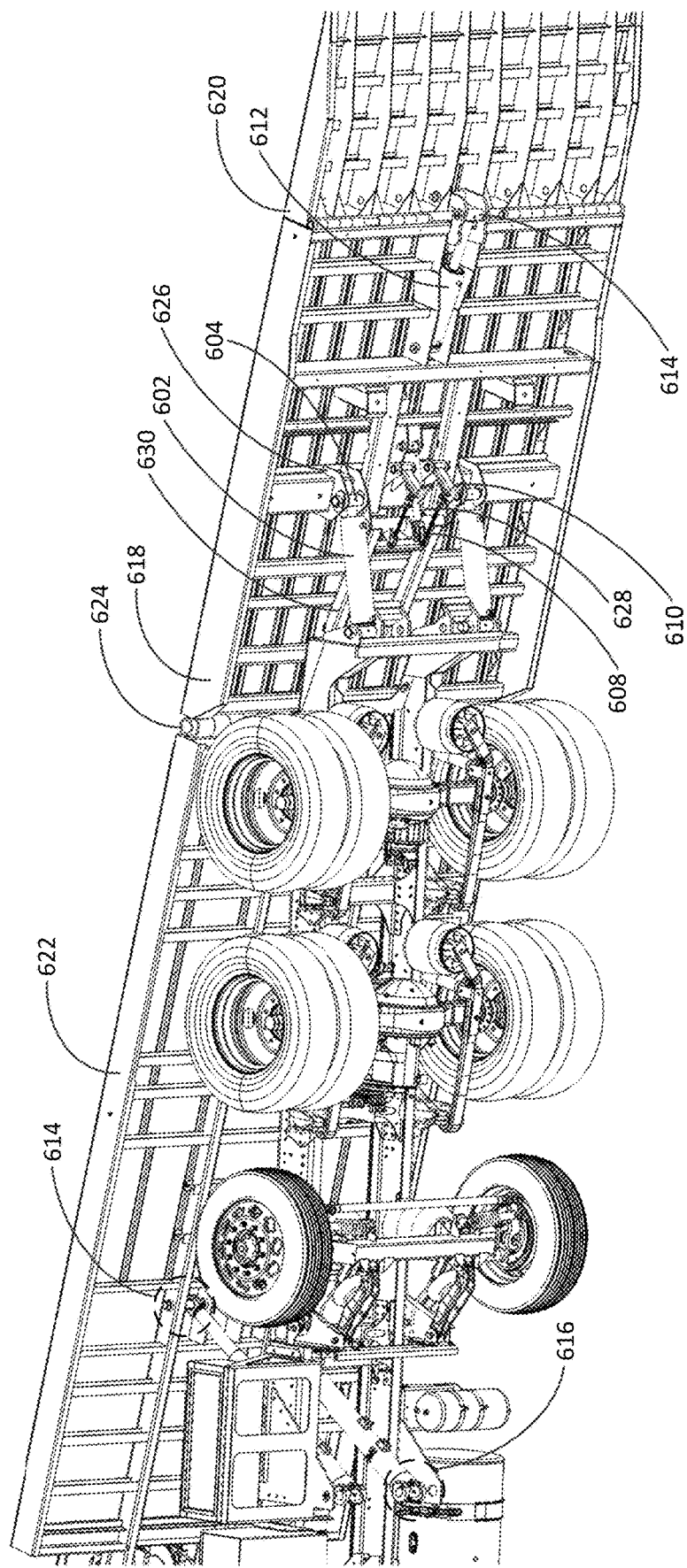
FIG. 6 illustrates the underside hydraulics and linkage of a truck bed according to one embodiment of the present invention.

FIG. 6 illustrates the underside of a truck bed in accordance with one embodiment of the present invention, specifically illustrating the linkage between the tail section 618 and fold tail section 620, as well as the various tail section and fold tail section hydraulic assemblies. FIG. 6 also illustrates the hydraulic cylinders that the bed section 622 uses to raise and lower to take on and off load cargo. As described in connection with FIG. 5, the hydraulic cylinders that the bed uses to raise and lower each have an eyelet structure at the bed end and a mounting pint passes through each eyelet in addition to one or more linking members to thereby link the hydraulic cylinders to the bed section 614. FIG. 6 illustrates similar linkages to interface the hydraulic cylinders to the truck chassis 616, although other suitable linkage structures know to those of skill in the art are suitable in addition to or in place of the structures described herein.

Like the bed section 622, the tail section 618 uses a pair of hydraulic cylinders 602 to pivot along a unified hinge 624 from a raised position, level with the bed section 622, to a lowered position, as shown in FIG. 6. Although embodiments of the invention may utilize any number of disparate power transfer mechanisms, as show here, a pair of double acting single stage hydraulic cylinders 602 lower and raise the tail section 618 along the unified hinge 624. As explained in connection with FIG. 7, a double-acting hydraulic cylinder 602 has a port at each end through which a given hydraulic cylinder is supplied hydraulic oil for both the retraction and extension of the piston. At the tail section 618 end of a given hydraulic cylinder 602 is an eyelet through which a mounting pin 604 can pass to affix the given hydraulic cylinder 602 to the tail section 618, e.g., by also passing through a pair of flanges 626 in communication with the tail section 618.

As further shown by the embodiment of FIG. 6, a fold tail section 620 is in a lowered or deployed position. The fold tail section 620 moves from a stowed position on an underside of the tail section 618 to a lowered or deployed position by a hydraulic cylinder 612 that moves the fold tail section 620 between the two positions. The hydraulic cylinder 612 of FIG. 6 is a double acting single stage hydraulic cylinder with an eyelet at the fold tail 620 end thereof that is affixed to the tail section 618 and the fold tail section 620 through the use of mounting pins and a linkage assembly, e.g., 614, although other suitable mechanisms to link such structures known to those of skill in the art fall within the scope of embodiments of the invention.

Separately provided is a retention mechanism to retain the fold tail section 620 when in its stowed position on the underside of the tail section, e.g., as FIG. 1 illustrates. In accordance with the present embodiment, extension and retraction of another double acting single stage hydraulic cylinder 628 causes rotation of an H-Lock 630 assembly that transfers power to cause the synchronized movement of a pair of control rods 608 in communication with corresponding L-hooks 610. When the driver desires to deploy or lower the fold tail section 620, the hydraulic cylinder 628 extends, causing the L-hooks 610 to disengage and allow movement of the fold tail section 620. When the driver completes any loading or unloading activity and subsequently moves the fold tail section 620 to its retracted or stowed position, the hydraulic cylinder 628 retracts and causes the L-hooks 610 to engage and prevent movement of the fold tail section 620. Locking the fold tail section 620 when in its stowed position relieves the hydraulic cylinder that controls movement of the fold tail section 620 from any unwanted stress that might damage the mechanism by causing it to hold the fold tail 620 section in place below the tail section 618.

Figure 7:
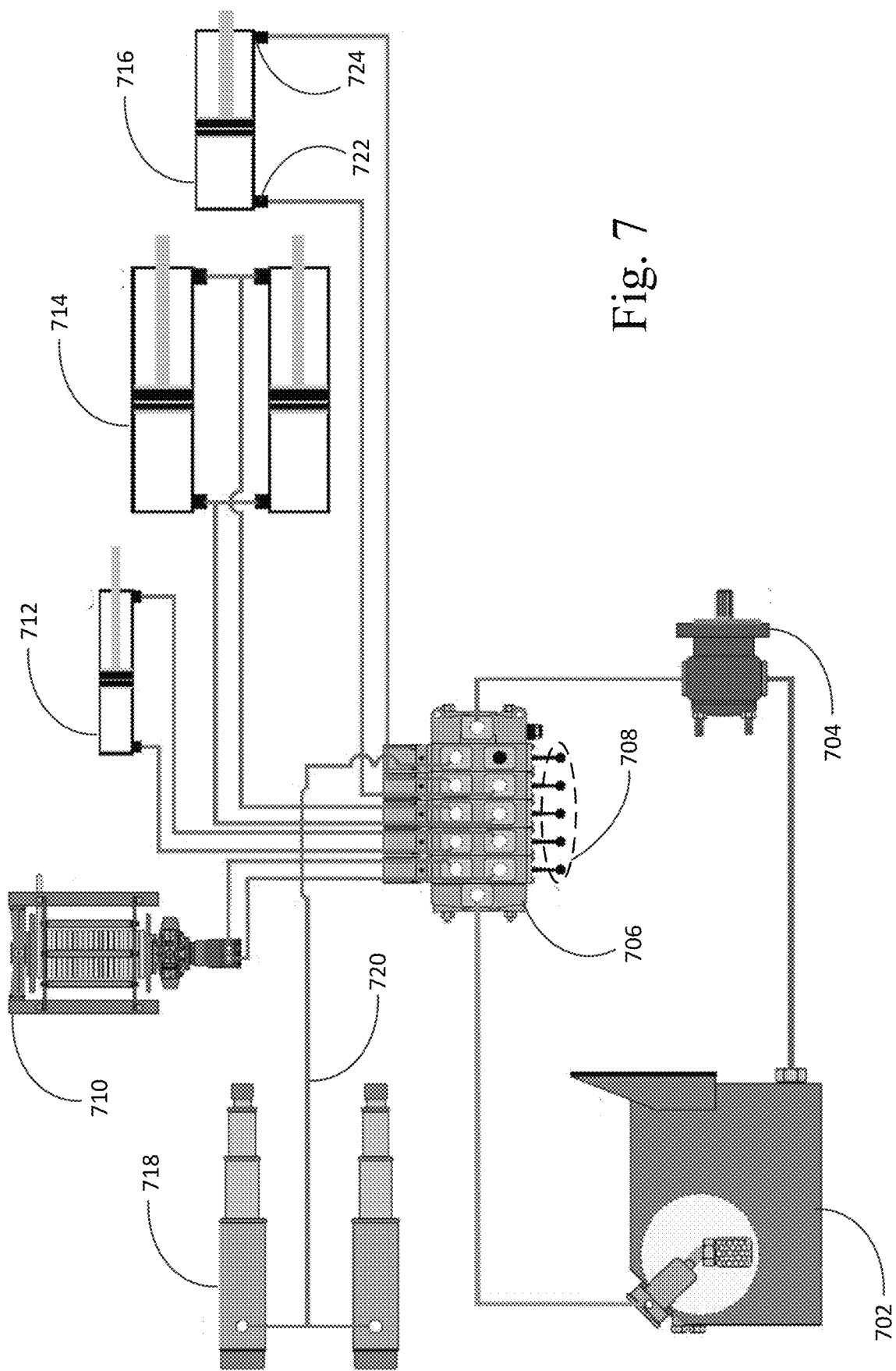
FIG. 7 illustrates a hydraulic circuit to raise and lower the sections comprising an HTHT truck bed according to one embodiment of the present invention.
Figure 8:
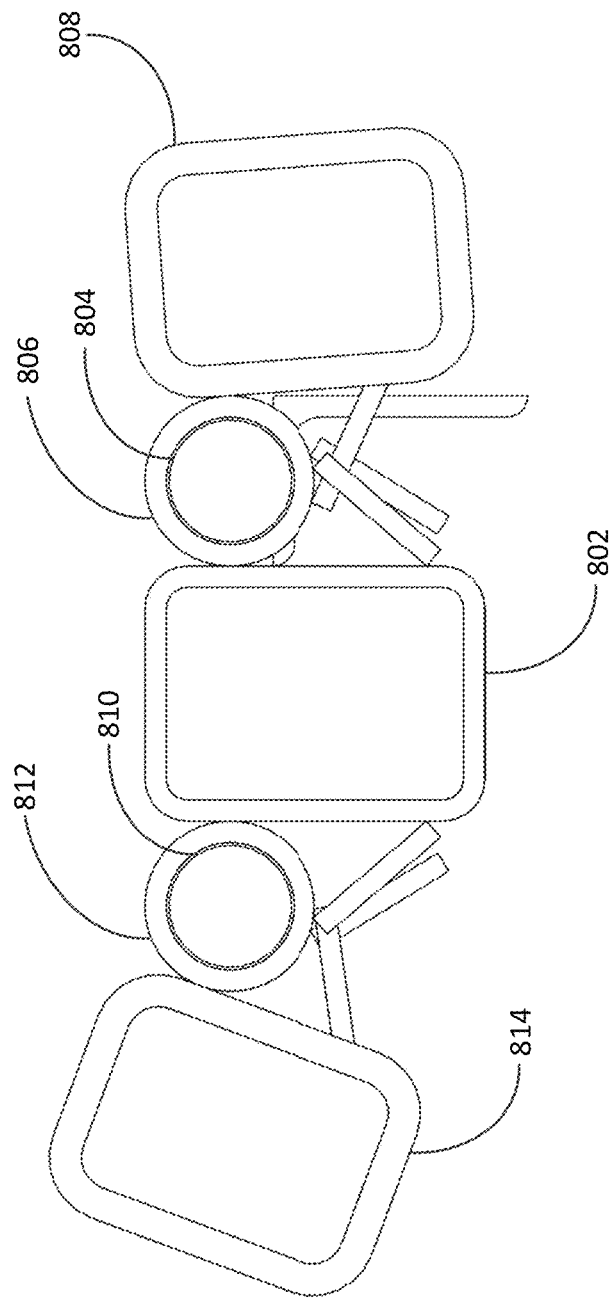
FIG. 8 illustrates a multi-part hinge according to the prior art.

FIG. 7 illustrates an exemplary hydraulic circuit to drive raising and lowering of the bed section, tail section, and fold tail section, which may also comprise interconnections to one or more other hydraulic circuits to control other systems. Various embodiments contemplate the use of various and disparate power sources in combination with various, disparate mechanical structures to raise and lower the bed section, tail section, and fold tail section. Beyond the use of hydraulic cylinders, other embodiments make use of gears, pullies, or other mechanical structures to distribute applied power and raise a given section from a flat position to a raised or lowered position, as well as vice versa. Although the present embodiment presents the use of hydraulic pumps to power the hydraulic lift cylinders, other power sources are contemplated as falling within the scope of embodiments of the present invention.

The hydraulic system in accordance with the embodiment of FIG. 7 generally comprises several major components, including, but not limited to: a transmission mounted power takeoff ("PTO") (not pictured), a hydraulic tank 702, a geared hydraulic pump 704, and a set of control valves that are part of a directional valve assembly 706. Various sets of lift cylinders are used to lower and raise the bed section 718, the tail section 714, and the fold tail section 716, as well as retract and deploy the fold tail hooks and H-Lock 712. The operator may also use control valve handles 708 that are part of the directional assembly 706 to direct power to the winch 710 and allow deployment or retraction of a line attached thereto, which the operator may use to assist in loading and unloading cargo onto and off of the truck bed.

According to one embodiment, the hydraulic system (pump, power take off, cylinders and valves) are engaged only from within the truck cab. Alternatively, or in conjunction with the forgoing, only the PTO is engaged from within the truck cab and the one or more sets of hydraulic cylinders, which can operate dependently or independently of one another, can be operated from an externally mounted control valve, hand operated control valve, electronic remote control, wired pushbutton control pendant, etc. Such operation may be limited to those situations only when the hydraulic system had been engaged or activated from within the cab, which provides a layer of security and the ability to secure the truck bed and prevent its contents from being slid off by the simple act of locking the truck cab doors.

The hydraulic circuit of FIG. 7 comprises a single hydraulic tank 702 and pump 704, which may be driven by a transmission mounted power takeoff. The pump 704 provides oil to a central, multi valve bank containing cylinder spool valves 706 to operate a set of hydraulic cylinders 718 operative to raise and lower a bed section, a set of hydraulic cylinders 714 operative to raise and lower a tail section, a hydraulic cylinder 716 operative to deploy and retract a fold tail section, a hydraulic cylinder 716 operative to deploy and retract a retention mechanism, and a hydraulic winch 710. A given pair of cylinders 714 and 716 are attached to a respective section of a truck bed, e.g., bed section and tail section, and plumbed together so as to both extend and retract simultaneously. Hydraulic oil is returned to the tank 702 from the valve bank 706 through a return line filter. Although the embodiment of FIG. 7 depicts pairs of hydraulic cylinders operative to raise and lower the bed section and the tail section, other embodiments may utilize a single hydraulic cylinder to raise a given section, or alternative mechanisms altogether.

As described in conjunction with other embodiments, such as those illustrated at FIGS. 1 through 6, extension and retraction of a pair of single acting telescopic hydraulic cylinders 718 raises and lowers the bed section, although double acting telescopic hydraulic cylinders and other suitable hydraulic cylinders fall within the scope of the various embodiments of the present invention. Because the weight of the bed section forces the hydraulic oil out of the telescopic cylinders and causes them to retract, there is only one bi-directional line 720 that carries hydraulic oil between the hydraulic cylinders 718 and the spool valves 706. This is in contrast to the double acting single stage hydraulic cylinders, 712, 714, 716 that have a port located on each end of the piston, e.g., 722 and 724, through which a given hydraulic cylinder is supplied hydraulic oil for both the retraction and extension of the piston. Each port 722 and 724 maintains a connection to the spool valves 706 though which it receives or transmits hydraulic oil to enter either an extended or retracted state. The winch 710 in the present embodiment is similarly double acting and receives hydraulic oil from the spool valves 706 to rotate in a first direction and transmits hydraulic oil to the spool vales 706 to rotate in a second direction.

Figure 9:
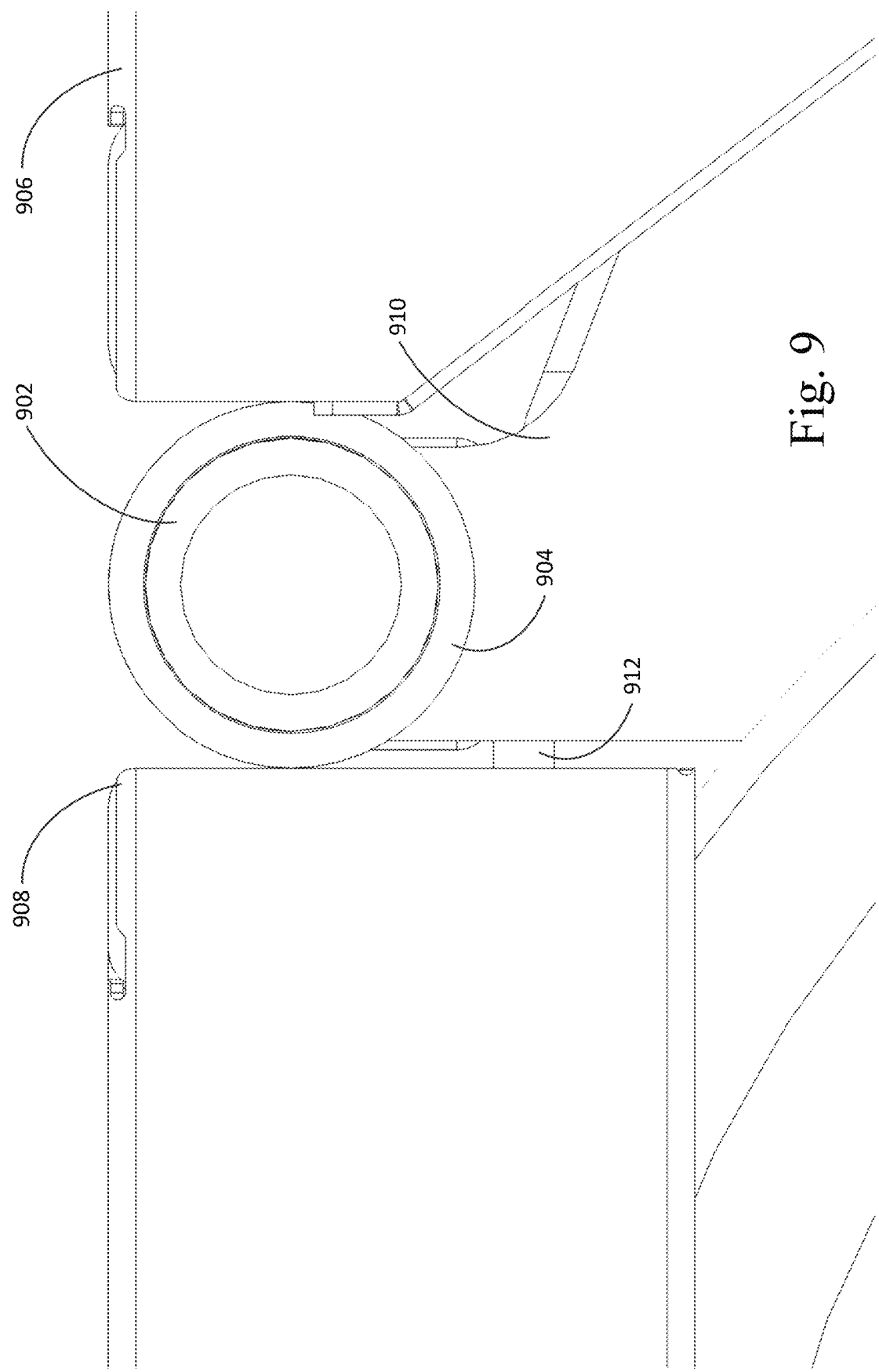
FIG. 9 illustrates a cross-section of a unified hinge according to one embodiment of the present invention.

As described throughout, the truck beds in accordance with embodiments of the present invention utilize a unified hinge to provide a single plane across the various sections comprising the truck bed when such sections are deployed state, e.g., the bed section is raised and the tail section is lowered, which thereby allows for roll off of cargo that is on the truck bed. FIG. 9 presents a side view of a unified hinge and supporting members that together provide for a single plane across the various sections comprising the truck bed in accordance with one embodiment of the present invention. The unified hinge 902 provides a member against which the bed section 908 and tail section may interface 906, but without a gap therebetween that is realized by the use of prior art interfaces discussed above.

In accordance with the embodiment of FIG. 9, the unified hinge comprises a hinge tube 902 that is rigidly affixed or otherwise attached, e.g., by spot welding, to a tail plate 910 that forms a part of the rear section of the truck chassis 912 and provides a mounting surface for the hinge tube 902, as well as other components described herein. Also provided are a plurality of opposing hinge barrels 904, which may be alternatingly affixed to the bed section 908 and the tail section 906 along the widths thereof. According to one embodiment, alternating, opposing hinge barrels 904 affixed to both the bed section 908 and the tail section 906 are interleaved with the hinge tube 902 running therethrough 904 and with the hinge tube 902 rigidly affixed to the tail plate 910. As is described in greater detail herein, alternative embodiments comprise the placement of or affixing one or more mounting barrels to a tail plate 910 that forms a part of the rear section of the truck chassis 912. Similar to other embodiments, a plurality of opposing hinge barrels 904 are affixed to the bed section 908 and the tail section 906, which may be alternatingly affixed to the bed section 908 and the tail section 906 along the widths thereof and concentrically align on the one or more mounting barrels. Running through the one or more mounting barrels is a hinge tube along which the hinge barrels affixed to the bed section and the tail section may align and pivot.

Figure 10:
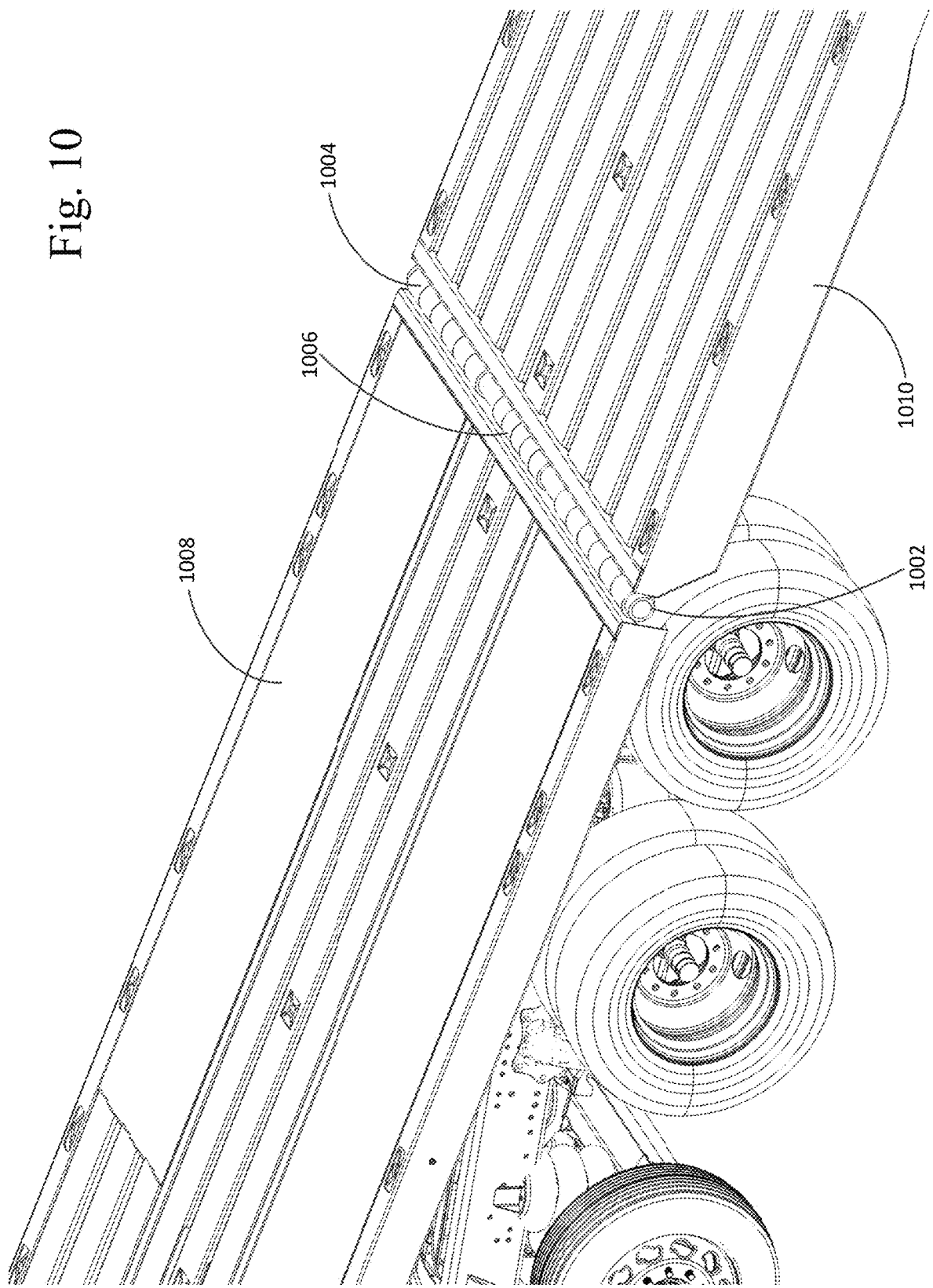
FIG. 10 illustrates a transparent view through a truck bed according to one embodiment of the present invention.

FIG. 10 presents a perspective view of one embodiment of the unified hinge of FIG. 9. As FIG. 10 illustrates, the bed section 1008 and the tail section 1010 are each affixed to a plurality of hinge barrels 1004. The hinge barrels 1004 may be alternating, e.g., a first and third groups affixed to a first section with an intermediate second group affixed to a second section. Alternatively, a number of barrel hinges may be provided with alternating barrel hinges affixed to a first section and a second section. According to the present embodiment, disposed within the channel created by the plurality of hinge barrels is a hinge tube 1002 rigidly affixed to some portion of the truck frame, e.g., a tail plate, that forms a unified hinge that provides a pivot point along which the bed section 1008 can raise, and the tail section 1010 may lower.

Advantageously, the unified hinge 1004 and 1002 provides a single plane between the bed section 1008 and the tail section 1010 when the sections are disposed in accordance with their various configurations.

Figure 11:
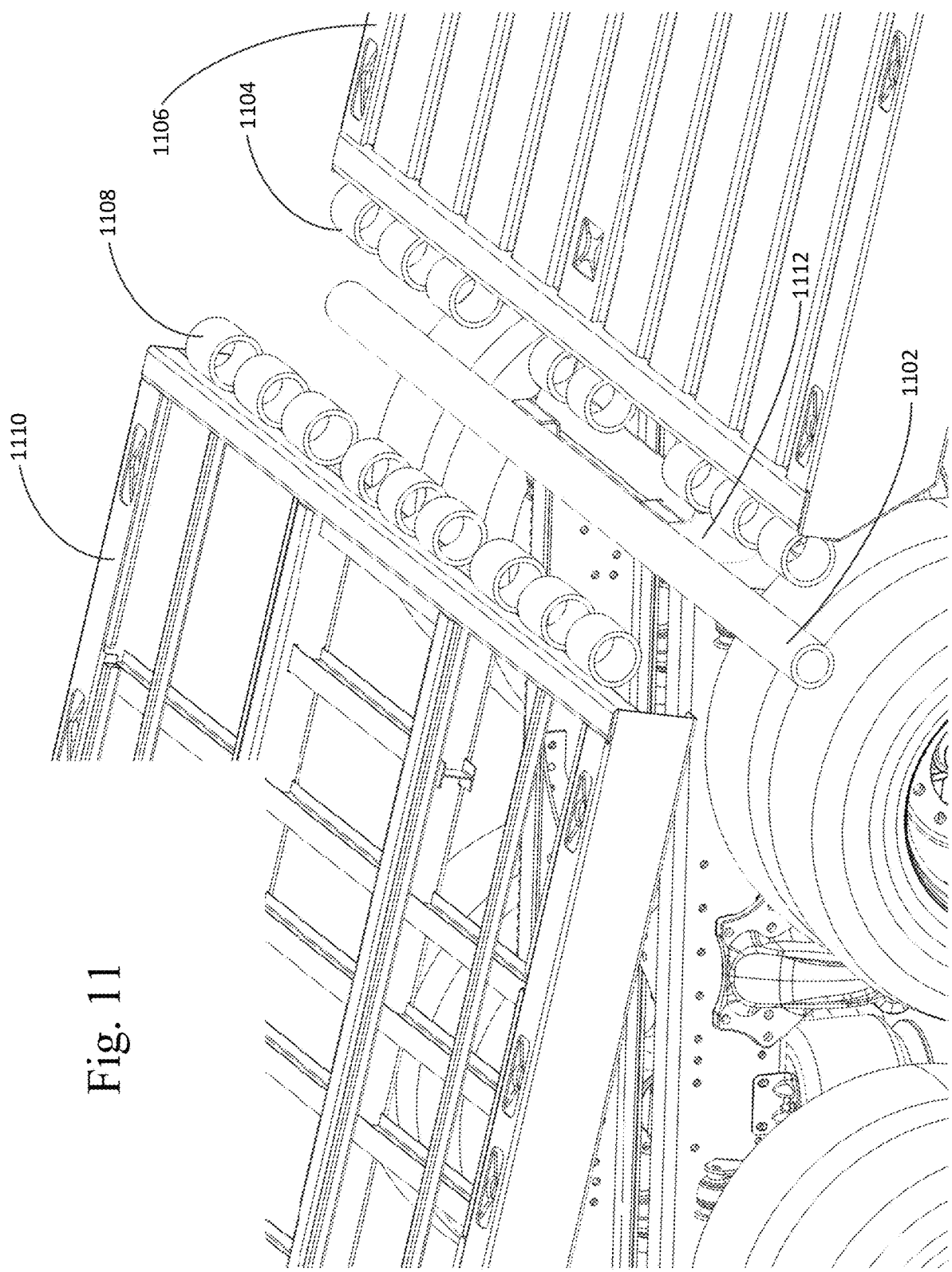
FIG. 11 illustrates an exploded isometric view of a unified hinge according to one embodiment of the present invention.

Providing additional detail to the embodiments presented in FIGS. 9 and 10, FIG. 11 provides an exploded view of the unified hinge in accordance with embodiments of the present invention. The hinge tube 1102 is affixed to the tail plate 1112 that is itself mounted or otherwise affixed to the truck chassis and provides a point around which the bed section 1110 and the tail section 1106 can pivot. To enable the ability to pivot around the hinge tube 1102, each of the bed section 1110 and the tail section 1006 are in communication with a one or more hinge barrels 1104 and 1108, which in the present embodiment consist of a plurality of interleaved hinge barrels 1108 and 1104 that are affixed to the bed section 1110 and the tail section 1106, respectively. In deployment, the hinge tube 1102 runs through the hinge barrels 1104 and 1108 so as to allow the bed section 1110 and the tail section 1106 to pivot around the hinge tube 1102 while maintaining the ability to provide a single plane across the bed section 1110 and the tail section 1106 in various configurations.

Figure 12A:
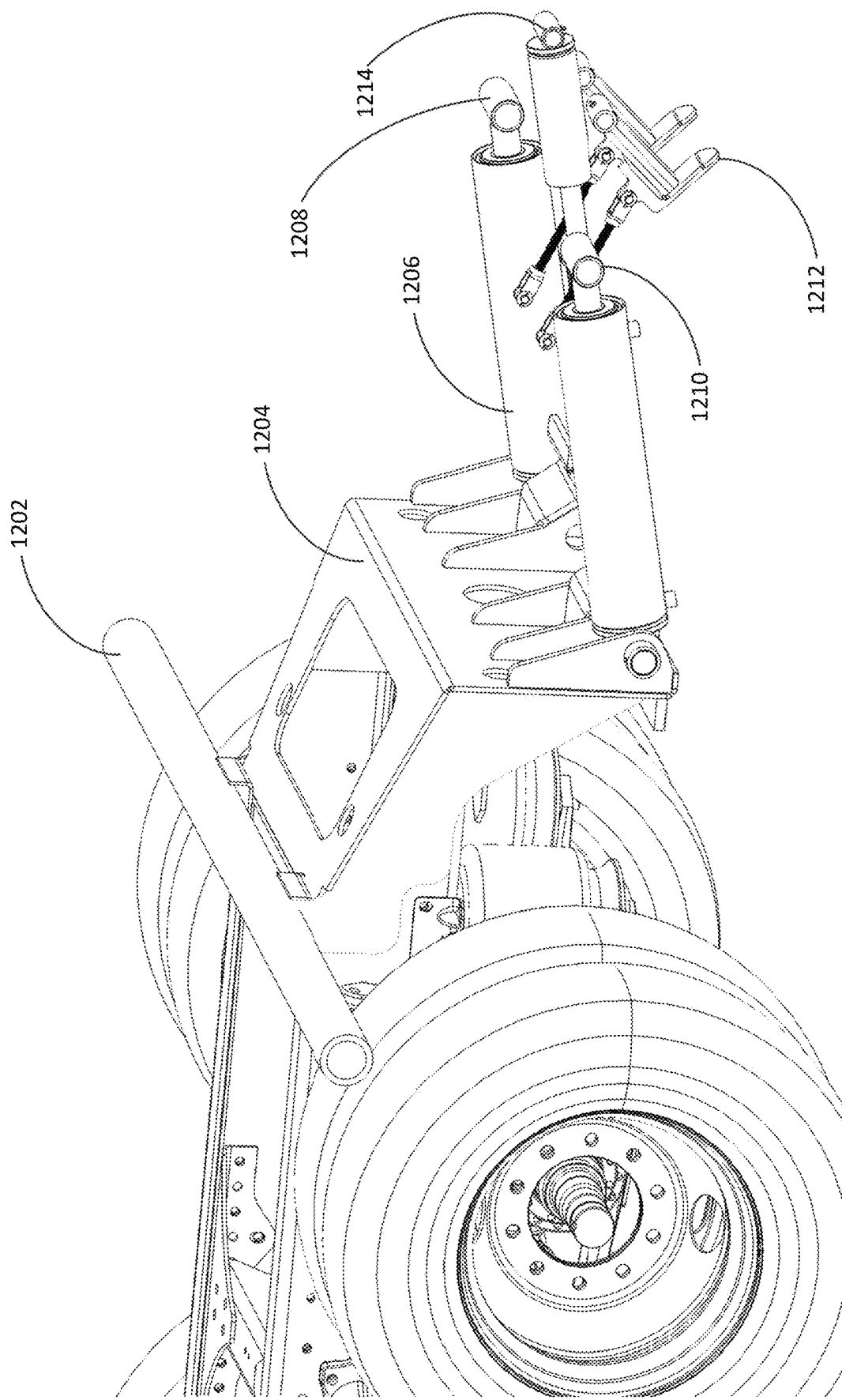
FIG. 12A illustrates a hinge tube and supporting structures of a unified hinge along which a bed section and a tail section of a truck bed may pivot according to one embodiment of the present invention.
Figure 12B:
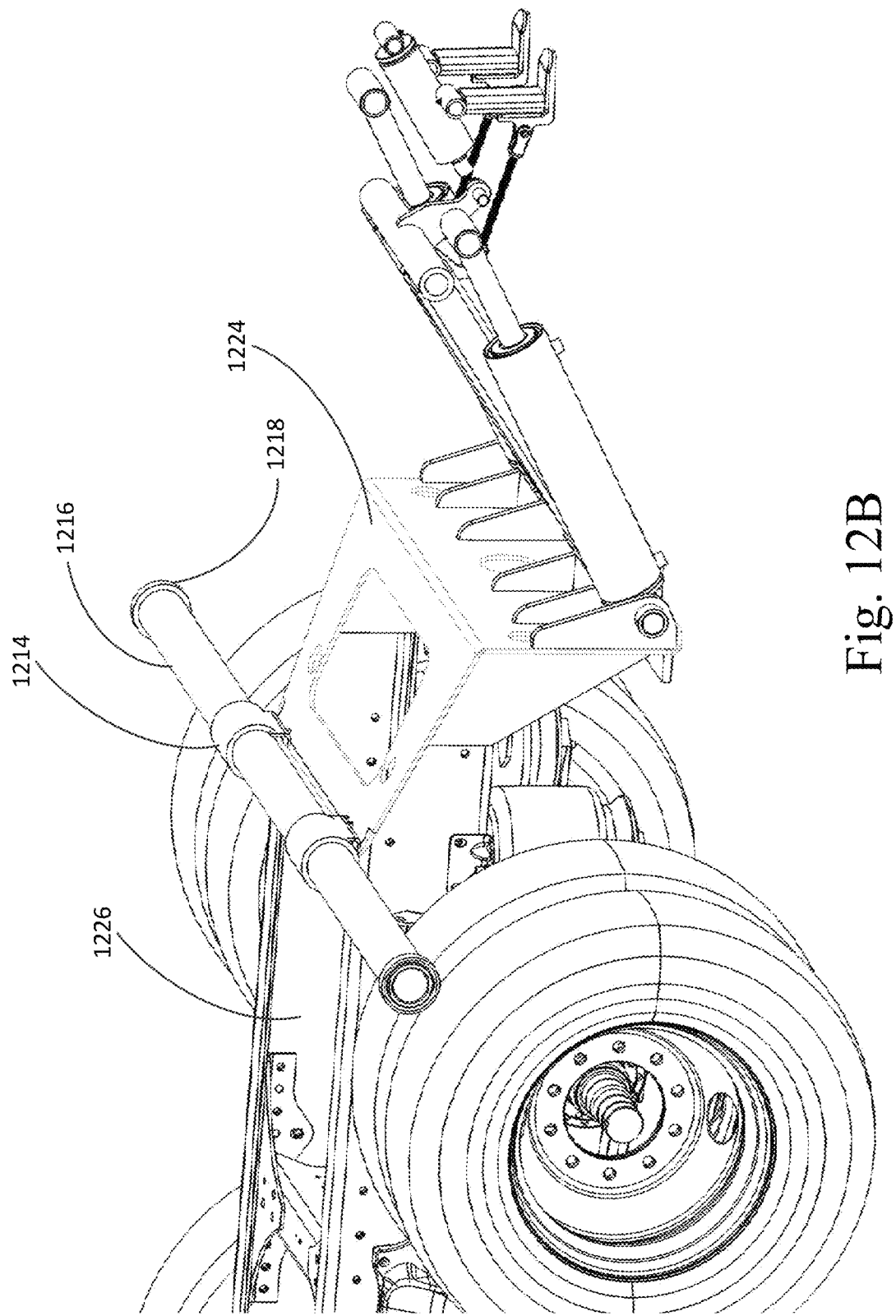
FIG. 12B illustrates a pair of mounting barrels and a hinge tube of a unified hinge along which a bed section and a tail section of a truck bed may pivot according to one embodiment of the present invention.

The main hinge tube may be implemented using a number of techniques, such as those illustrated in FIGS. 12A and 12B. In accordance with the embodiment of FIG. 12A, the hinge tube or pin 1202 is rigidly affixed to a tail plate 1204 that is itself mounted on the truck chassis 1216. Using the configuration of FIGS. 12A, the bed section is configured along one edge with a plurality of hinge barrels and the tail section has similarly opposing hinge barrels. Each of the hinge barrels along the bed section and the tail section concentrically along on the main pin or tube. Accordingly, the bed section pivots along the hinge pin or tube whereas the tail section independently pivots along the same hinge pin or tube; the hinge pin or tube itself is affixed to the body of the truck and does not itself rotate or move in any manner.

The tail plate 1204 acts as a mounting point for additional components beyond those comprising the unified hinge 1202. For example, the tail plate provides a mount point for hydraulic cylinders 1206 used to lower and raise the tail section (not pictured). At an end of each of the hydraulic cylinders distal to the tail plate is an eyelet, 1208 and 1210, that attaches to the underside of the tail section such that retraction of the pistons in the hydraulic cylinders 1206 causes the tail section to lower, whereas movement of the pistons in the opposing direction causes the tail section to raise. FIGS. 12A and 12B also illustrate the hydraulic cylinder 1214 that provides for deployment and retraction of the fold tail lock, which is freed for deployment by synchronized movement of a pair of L-locks 1212, which also move back into place to lock the fold tail section upon retraction.

FIG. 12B presents an alternative structure by which to provide for mounting of components comprising the unified hinge 1214, 1216, 1218 to the tail plate 1224 set forth in FIG. 12A. More specifically, instead of mounting the hinge pin 1202 to the tail plate 1204 of FIG. 12A, the embodiment of FIG. 12B illustrates one or more mounting barrels 1214 that are rigidly affixed or otherwise mounted to the truck frame 1226, e.g., via the tail plate 1224. Running through the one or more mounting barrels 1214 is a hinge tube 1216 along which the hinge barrels affixed to the bed section and the tail section may align and pivot. To prevent the hinge tube 1216 from slipping or otherwise becoming dislodged, caps, ridges, rings, etc. 1218 may be placed on one or more ends of the hinge tube 1216.

Figure 13:
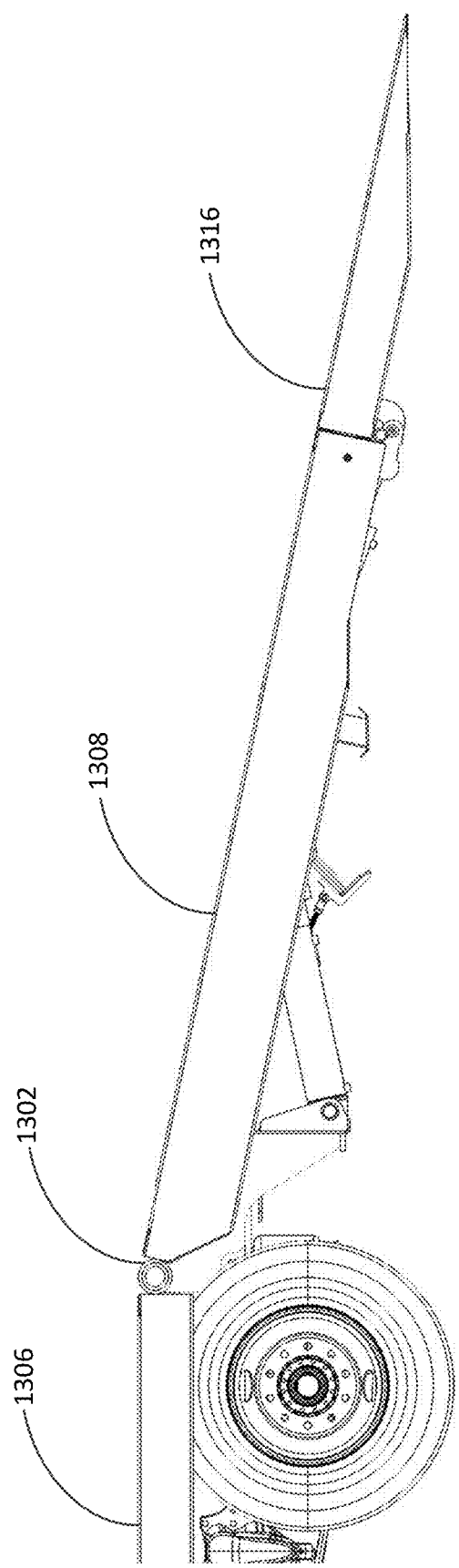
FIG. 13 illustrates a side view of the unified hinge linking the sections of a truck bed according to one embodiment of the present invention.

FIG. 13 illustrates a side view of a truck bed in which the bed section 1306 is down or in its lowest position, the fold tail section 1316 is deployed, and the tail section 1308 is also in its lowest position. Use of the unified hinge 1302 provides for a tight linkage between the bed component and the tail/fold tail components.

Figure 14:
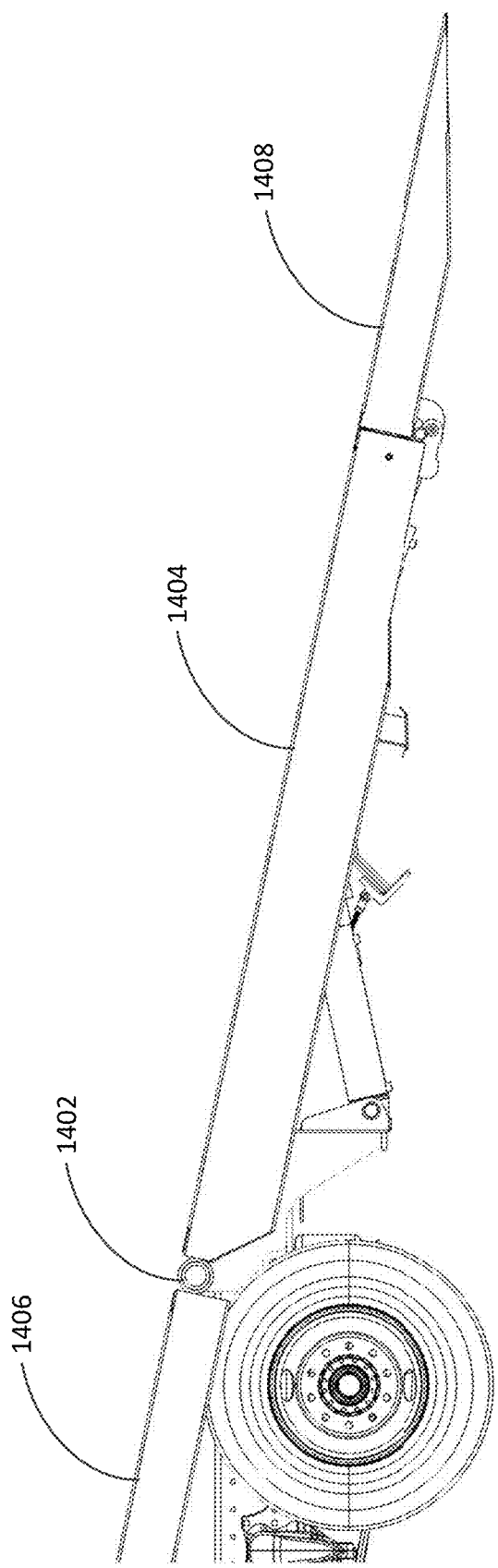
FIG. 14 illustrates a side view of the unified hinge linking the sections of a truck bed according to a further configuration of one embodiment of the present invention.

FIG. 14 builds on the embodiment introduced in connection with FIG. 13, illustrating a cross-section view of the bed section 1406 in a raised position in conjunction with the tail section 1404 in a lowered position and the fold tail section 1408 is a deployed position. As can be seen, the unified hinge 1402 provides both a tight linkage between components and allows deployment of each component and the same angle, thereby providing a straight plane from end to end on the truck bed, e.g., from distal end of the bed section 1406 to the proximate end of the fold tail section 1408 in its deployed configuration. Allowing for a single plane to be provided by the raised bed section 1406, the lowered tail section 1404, and the deployed fold tail section 1408 is in direct opposition to prior art systems that utilize a central member and therefore cannot provide a single plane when the bed section 1406 is raised and the tail section 1404 is lowered, regardless of whether the operator deploys the fold tail 1408 or keep it in its stowed position.

FIGS. 1 through 14 are conceptual illustrations allowing for an explanation of various embodiments of the present invention. Those of skill in the art should understand that various aspects of the implementations of the present invention could be implemented in other forms of hardware, or combinations thereof, to perform the functions of the present invention. That is, the same piece of disparate hardware could perform one or more of the illustrated blocks (e.g., components or steps).

Notably, the figures and examples above are not meant to limit the scope of the present invention to a single implementation, as other implementations are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an implementation showing a singular component should not necessarily be limited to other implementations including a plurality of the same component, and vice-versa, unless explicitly stated otherwise herein. Moreover, Applicant does not intend for any term in the specification or claims to be ascribed an uncommon or special meaning unless explicitly set forth as such. Furthermore, embodiments of the present invention encompass present and future known equivalents to the known components referred to herein by way of illustration.

The foregoing description of the specific implementations will so fully reveal the general nature of the invention that others can, by applying knowledge within the skill of the relevant art(s) (including the contents of the documents cited and incorporated by reference herein), readily modify and/or adapt for various applications such specific implementations, without undue experimentation, without departing from the general concept of the present invention. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various implementations of embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention, as illustrated by the exemplary embodiments presented herein, should not be limited by any of the above-described exemplary implementations, but should be defined only in accordance with the following claims and their equivalents.

What is claimed is:

1. A unified hinge comprising:
a hinge tube that is rigidly attached to a truck frame; and
a bed section of a truck bed and a tail section of the truck bed, each of the bed section and the tail section having opposing hinge barrels affixed thereto that concentrically align on the hinge tube, wherein the bed section and the tail section are pivotable with respect to the truck frame along the hinge tube.

2. The unified hinge of claim 1 wherein the bed section and the tail section independently pivot along the hinge tube.

3. A unified hinge comprising:
one or more mounting barrels that are rigidly attached to a truck frame;
a bed section of a truck bed and a tail section of the truck bed, each of the bed section and the tail section having opposing hinge barrels affixed thereto that concentrically align on with the one or more mounting barrels; and
a hinge tube that runs through the one or more mounting barrels and the opposing hinge barrels, wherein the bed section and the tail section are pivotable with respect to the truck frame along the hinge tube.

4. The unified hinge of claim 3 wherein the bed section and the tail section independently pivot along the hinge tube.

5. A truck bed, comprising:
a hinge tube that is rigidly attached to a truck frame of a truck;
a bed section of a truck bed and a tail section of the truck bed, each of the bed section and the tail section having opposing hinge barrels affixed thereto that concentrically align on the hinge tube;
a first hydraulic cylinder attached to the truck frame and the bed section, wherein extension of a piston in the first hydraulic cylinder causes the bed section to raise; and
a second hydraulic cylinder attached to the truck frame and the tail section, wherein extension of a piston in the second hydraulic cylinder causes the tail section to lower.

6. The truck bed of claim 5 wherein the first hydraulic cylinder comprises a first pair of hydraulic cylinders.

7. The truck bed of claim 5 wherein the second hydraulic cylinder comprises a second pair of hydraulic cylinders.

8. The truck bed of claim 5 comprising a fold tail section and an interface that connects the fold tail section to the tail section.

9. The truck bed of claim 8 wherein the interface allows the fold tail section to move between a stowed state and a deployed state.

10. The truck bed of claim 9 wherein the stowed state comprises affixing the fold tail section to an underside of the tail section.

11. The truck bed of claim 9 comprising a third hydraulic cylinder attached to the tail section and the fold tail section, wherein extension of a piston in the third hydraulic cylinder causes the fold tail section to move between the stowed state and the deployed state.

12. The truck bed of claim 9 comprising a lock to maintain the fold tail section in the stowed state and relieve pressure on the third hydraulic cylinder.

13. The truck bed of claim 5 wherein the first hydraulic cylinder is a single acting telescoping hydraulic cylinder.

14. The truck bed of claim 5 wherein the second hydraulic cylinder is a dual acting single stage hydraulic cylinder.

15. The truck bed of claim 5 comprising a control interface to extend and retract the piston in the first hydraulic cylinder and the piston in the second hydraulic cylinder.

16. The truck bed of claim 15 wherein the control interface comprises a set of one or more physical controls affixed to the truck frame.

17. The truck bed of claim 15 wherein the control interface comprises a remote control carried by an operator of the truck.

* * * * *